(12) United States Patent
Kaya

(10) Patent No.: US 12,187,540 B2
(45) Date of Patent: Jan. 7, 2025

(54) AUTOMATION SYSTEM FOR WAREHOUSE

(71) Applicant: Asis Otomasyon ve Akaryakit Sistemleri Anonim Sirketi, Ümraniye/Istanbul (TR)

(72) Inventor: Yusuf Kaya, Ümraniye/Istanbul (TR)

(73) Assignee: Asis Otomasyon ve Akaryakit Sistemleri Anonim Sirketi, Ümraniye/Istanbul (TR)

( * ) Notice: Subject to any disclaimer, the term of this patent is extended or adjusted under 35 U.S.C. 154(b) by 354 days.

(21) Appl. No.: 17/765,594

(22) PCT Filed: Jun. 15, 2021

(86) PCT No.: PCT/TR2021/050606
§ 371 (c)(1),
(2) Date: Mar. 31, 2022

(87) PCT Pub. No.: WO2021/257036
PCT Pub. Date: Dec. 23, 2021

(65) Prior Publication Data
US 2022/0340365 A1    Oct. 27, 2022

(30) Foreign Application Priority Data

Jun. 18, 2020    (TR) .............................. 2020/009486

(51) Int. Cl.
*B65G 1/10*       (2006.01)
*B65G 1/137*      (2006.01)
*G06Q 10/08*      (2023.01)

(52) U.S. Cl.
CPC ........... *B65G 1/1375* (2013.01); *G06Q 10/08* (2013.01); *B65G 2209/04* (2013.01); *B65G 2209/06* (2013.01)

(58) Field of Classification Search
CPC .............. B65G 1/1375; B65G 2209/04; B65G 2209/06; B65G 2203/0283; B65G 2203/046; G06Q 10/08
See application file for complete search history.

(56) References Cited

U.S. PATENT DOCUMENTS 11,348,066 B2 *   5/2022   Galluzzo .............. G05D 1/0011
11,820,224 B2 *  11/2023   Chandrasekar ...... G06Q 10/087
(Continued)

FOREIGN PATENT DOCUMENTS

JP       2009298522 A      12/2009
WO    WO-2013102212 A1 *  7/2013  .............. B66F 9/063
(Continued)

OTHER PUBLICATIONS

International Search Report corresponding to Application No. PCT/TR2021/050606 mailed on Dec. 1, 2021.

*Primary Examiner* — Saul Rodriguez
*Assistant Examiner* — Lucia Elba Rodriguez
(74) *Attorney, Agent, or Firm* — Renner, Otto, Boisselle & Sklar, LLP

(57) ABSTRACT

In accordance with the object of the present invention, it relates to a product storage area automation system having abase, at least one shelf unit located on this base and on which a various number of products are arranged, a shelf controller associated with this at least one shelf unit, a main control unit configured to communicate with the said shelf controller and equipped with an automation software, and a wheeled vehicle including a cart controller configured to communicate with the said main control unit and a product identity reader configured to read the information on each product. Here, at least one shelf unit includes a number of lighting elements configured to communicate with the said (Continued)

shelf controller and the said wheeled vehicle includes a riding stand so as to carry a human product collector.

16 Claims, 7 Drawing Sheets

(56) References Cited

U.S. PATENT DOCUMENTS

| | | |
|---|---|---|
| 2011/0266078 A1 | 11/2011 | Hupke |
| 2014/0074341 A1 | 3/2014 | Weiss |
| 2016/0236867 A1* | 8/2016 | Brazeau .................. B25J 5/007 |
| 2017/0158431 A1* | 6/2017 | Hamilton ......... G05B 19/41895 |

FOREIGN PATENT DOCUMENTS

| | | |
|---|---|---|
| WO | 2013167907 A1 | 11/2013 |
| WO | 2017100287 A1 | 6/2017 |

* cited by examiner

AUTOMATION SYSTEM FOR WAREHOUSE

This application is a national phase of International Application No. PCT/TR2021/050606 filed 15 Jun. 2021, which claims priority to Turkey Application No. 2020/09486 filed 18 Jun. 2020, the entire disclosures of which are hereby incorporated by reference.

TECHNICAL FIELD

The present invention relates to an automation system suitable for allowing the products stored in a storage area to be transported to a location.

BACKGROUND OF THE INVENTION

The products may be stored in various areas from production to sale or delivery on their way. The products in the storage area are subjected to several handling until they are brought to a location such as a distribution center or point of sale. After the needed product arrives at the storage area, a collector is sent to the location in the storage area of the respective product and transports the product to its predetermined location after putting it in a carrier which is usually a wheeled vehicle.

Especially, when it comes to large-scale retail stores such as supermarkets, hypermarkets, the efficiency of the product transportation operation between the storage area and the product display stands (or points of sale), or in a similar way, the efficiency of loading operation of the products from a larger main store into the empty shelves in the storage area come into prominence. Thus, an optimal level is tried to be achieved by taking into account factors such as the time between the storage area and the location where the product is required, the consumed labor force, meeting customer expectations sufficiently.

A certain level of automation between the product storage area and the location where the products will be sent is usually desired. In some applications, the automation level is relatively high and even full automation solutions are deployed. For example, WO 2013/167907 discloses a storage system suitable for storing automatically more than one product line in a storage area. The storage system includes a number of stacks of boxes, a first transport device capable of taking a number of boxes from a stack in a single operation and a second transport device capable of lifting a single box and moving it laterally. The first and second transport devices are placed on a frame and may be moved independently of each other in order to access different stacks. While the system disclosed in WO 2013/167907 includes a high level of automation, its obvious disadvantage is the enormous cost. Further, the installed space requirements of the system is high.

WO 2017/100287 discloses a relatively low-cost product storage automation system. The automation system disclosed in WO 2017/100287 is associated with a number of wheeled vehicle directed by a product collector (i.e. a human) and a central controller. The product collector obtains the location information of a product to be picked from a monitor mounted on a cart and the cart follows him while walking towards this location. A different (more convenient) cart may also be employed for a respective product location. That is, the movement order in the storage area of the carts may be managed under the framework of an optimization algorithm. The product is placed into the cart after it is taken from the respective location (its location in the shelf) and passed through a reader such as a barcode reader mounted on the cart, so that the product collector continues its movement to pick the subsequent product (or to proceed to another point such as a point of sale).

According to WO 2017/100287, the location information of the carts within the storage area may be provided by the sensors mounted to each cart These sensors may sense various information sources that are pre-arranged in the storage area and therefore whose location is known, e.g. words, one/two/three-dimensional codes, etc. A lot of information such as the instant location of the cart the picked product and the product to be picked are transferred wirelessly between the cart and the central computer.

The automation system of WO 2017/100287 has several disadvantages. This system first highly depends on the human and especially, depends on the human with certain physical abilities. For example, the collector must consistently walk in order to reach the target product locations. This situation causes time losses at first, because each product collector has the ability to walk in a certain speed and it may not be expected that this ability of each collector is same. On the other hand, the fact that the product collectors have certain physical characteristics prevents them from making benefit of a significant social responsibility opportunity, e.g. taking advantage of a disabled workforce.

On the other hand, the automation system of WO 2017/100287 causes time losses in other aspects. For example, the location of the product to be picked is not suitable to be determined simply and precisely for the collector. The collector inevitably puts effort into locating the target product and thus, the total time spent in a storage area where thousands of products are picked increases.

DESCRIPTION OF THE INVENTION

The object of the present invention is to provide an effective automation system for transporting the products in the product storage area.

According to its object, the present invention is a product storage area automation system having
  a base,
  at least one shelf unit located on this base for arranging a number of products,
  a shelf controller associated with this at least one shelf unit,
  a main control unit configured to communicate with the shelf controller and equipped with an automation software,
  a wheeled vehicle comprising a cart controller configured to communicate with the main control unit and a product identity reader configured to read the information on each product,
  wherein at least one said shelf unit comprises a plurality of lighting elements configured to communicate with the said shelf controller and the said wheeled vehicle comprises a riding stand for carrying a human product collector.

According to one embodiment of the invention, the automation system comprises at least a first shelf unit and at least a second shelf unit, and the shelf controller of the second shelf unit is configured to communicate only with the first shelf controller while the shelf controller of the first shelf unit is configured to communicate with the main control unit.

According to one embodiment of the invention, the lighting element preferably is a LED radiating in various colors and the LEDs extend at least partially through the respective shelf in the form of a strip.

The location of the wheeled vehicle on the base may be determined by various electronic arrangements. According to one embodiment of the invention, the base includes a number of tags each having a unique electronic product code and the wheeled vehicle comprises at least one reader configured to wirelessly communicate with these tags. In such a case, the reader may be, for example, an ultra-high frequency (UHF) reader or a matrix reader which consists of a number of receiving antenna and transmitting antenna arranged to constitute a matrix with each other. The location of the wheeled vehicle may also be determined by the ultra-wideband (UWB) technology. Therefore, each wheeled vehicle is equipped with a tag, and an arrangement such that they communicate with the fixed reader (nodes) of which locations are known may be constructed.

BRIEF DESCRIPTION OF DRAWINGS

The embodiment and advantages of the present invention with additional elements should be evaluated together with the figures described below in order to be best understood.

REFERENCE NUMERALS OF THE PARTS IN THE DRAWINGS

Figure 1:
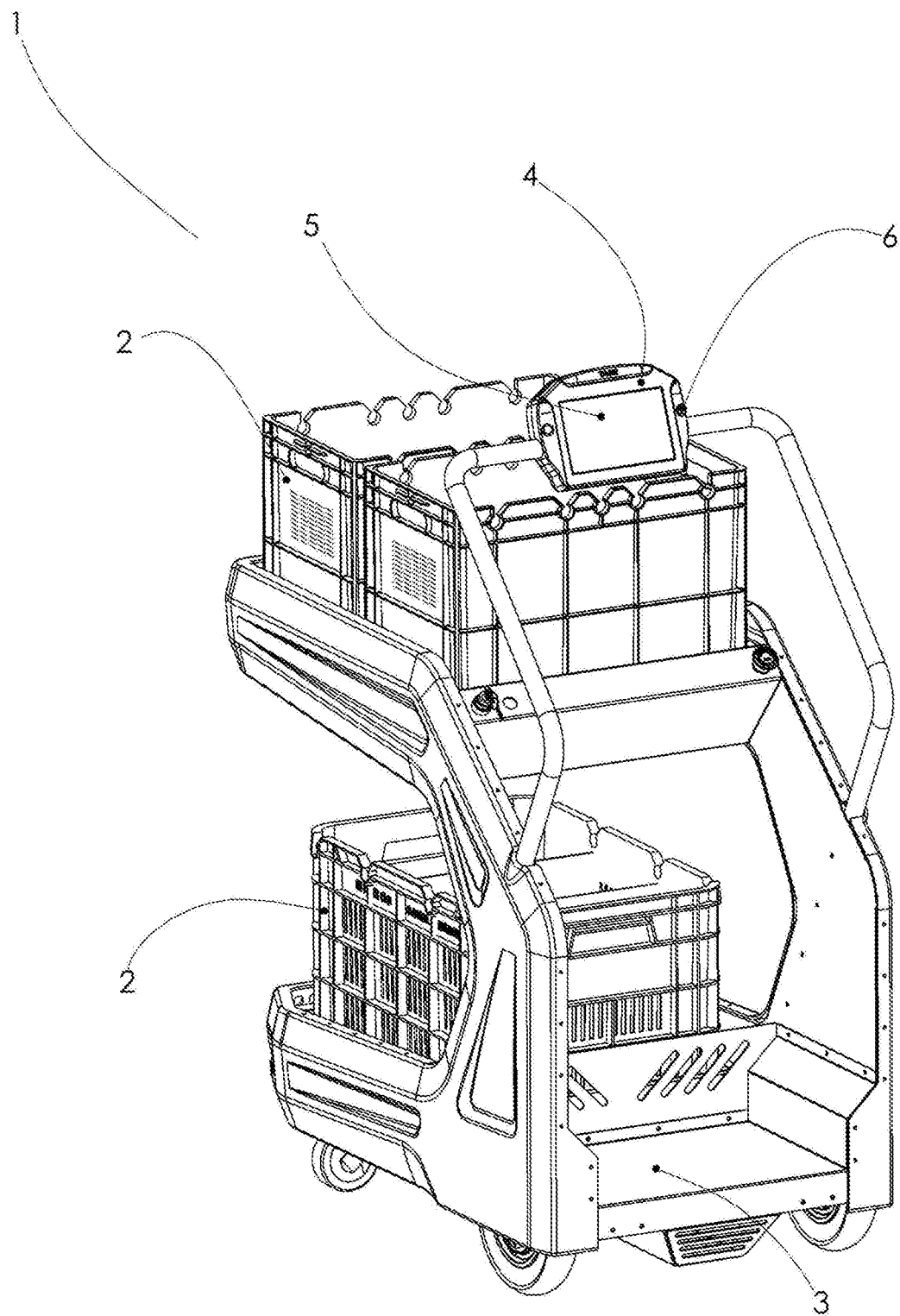
In FIG. 1, an elevated perspective view of the rear part of the wheeled vehicle in the automation system in accordance with the invention is provided.

1 Wheeled vehicle
2 Cart
3 Riding stand
4 Cart controller
5 Interface screen
6 Control button
7 Product identity reader
8 Lidar
9 Shelf series
10 Shelf unit
11 Shelf partition
12 Lighting element
13 Product
14 Shelf controller
15 Reader
16 Tag
17 Hallway
18 Transmitting antenna
19 Receiving antenna
20 Cart tag
21 Fixed reader
22 Main controller
23 Computer
24 Cable

DETAILED DESCRIPTION OF THE INVENTION

Figure 2:
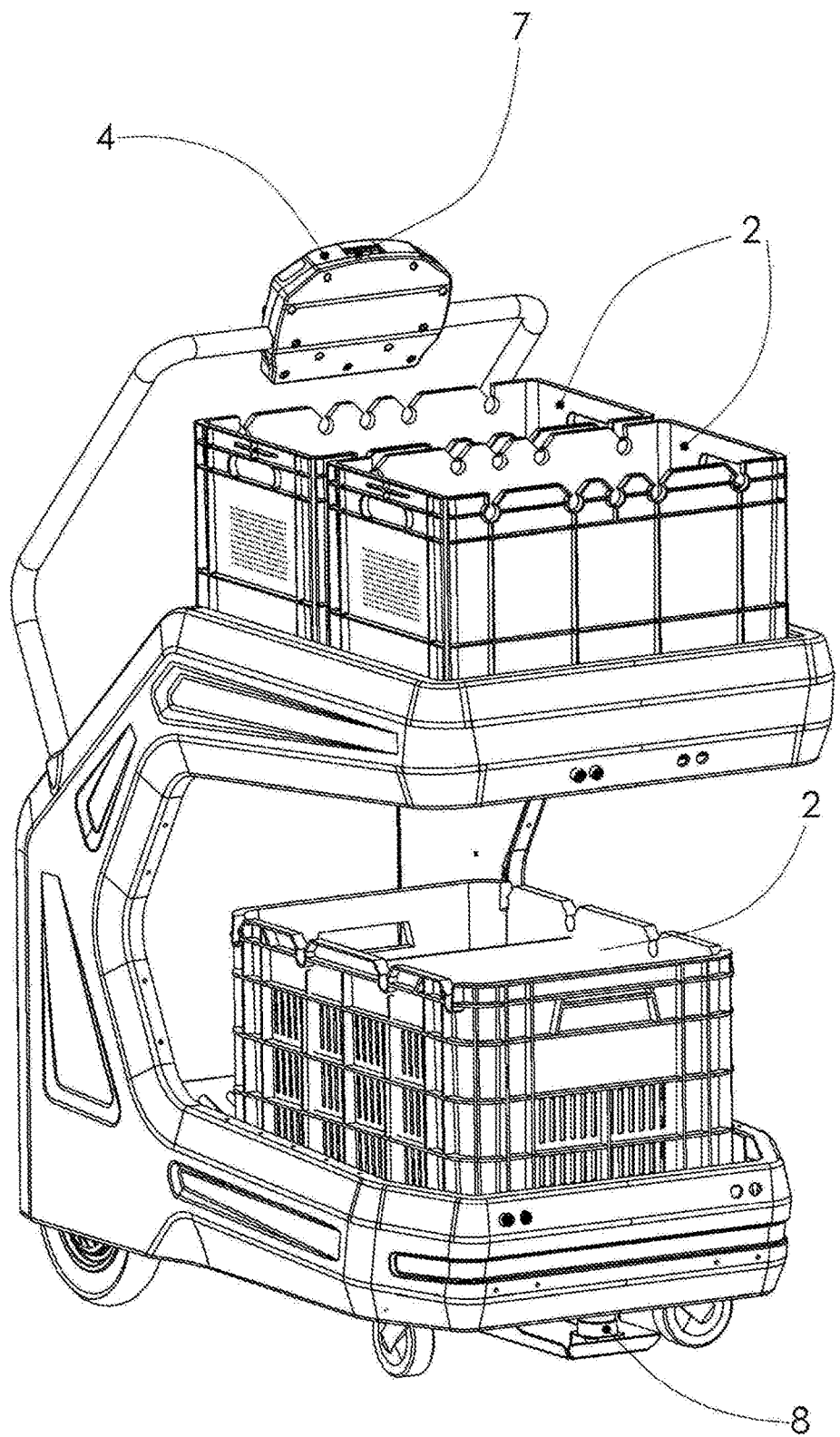
In FIG. 2, an elevated perspective view of the front part of the wheeled vehicle in the automation system in accordance with the invention is provided.

According to the invention, the automation system comprises various system components. One of these components, wheeled vehicle 1, is shown in FIG. 1 and FIG. 2. The wheeled vehicle (1) is an autonomous vehicle driven by a power source such as electrically rechargeable battery. According to the preferred embodiment of the invention, the wheeled vehicle (1) comprises a riding stand (3) for carrying a human collector to pick products.

Within the scope of this specification, the term "product collector" or "collector" should be understood as a human who picks products that have already been arranged on a shelf from a shelf or loads/puts products in a space on the shelf.

An exemplary embodiment is given in FIG. 1 and FIG. 2, wherein a product collector can stand and be carried. Carrying the product collector in standing position can be advantageous in that the collector can easily get off the wheeled vehicle (1), when necessary, and quickly access the products on the shelves or the space on the shelf, or when picking the products from the shelf or putting them into the space on the shelf, which will be explained below. It should be appreciated that the riding stand (3) can be arranged in several ways. For example, an arrangement as a seat can be provided. Thus, the riding stand (3) of the wheeled vehicle (1) eliminates the trouble of walking from one location to another in the storage area of the product collector.

The wheeled vehicle (1) may comprise several carts (2) in which the products can be placed. Using more than one cart (2) can be advantageous in terms of parallel picking wherein the products in different order lists are specified in which cart to be placed. Alternatively, it can be advantageous in terms of a picking method in which it would be more convenient/effective to put interrelated product types in different carts. Each cart (2) can be configured to be disassembled from and attached to the wheeled vehicle. The term "cart" used through this specification should be considered as a generic term. In some cases, the products to be picked may not necessarily be put into a chamber such as a container/box. For example, when the product is a suit or cloth, the "cart" can then be a hanger.

The wheeled vehicle (1) within the scope of the invention includes a cart controller (4). The cart controller (4) is arranged so as to communicate wirelessly with the main control unit with a controller which will be disclosed below. The wheeled vehicle (1) also comprises an interface screen (5). Through the interface screen (5), various information such as the order list (or lists) related to the products to be picked from or put on the shelf, the type, quantity, and weight of the products, the information related to the subsequent product to be picked and the subsequent location information can be displayed. The wheeled vehicle (1) may comprise a control button (6) being arranged such that the product collector may easily access (for example, near the interface screen (5). In order to stop or activate the wheeled vehicle (1) by means of this control button (6) when necessary, a command may be generated or it can be used to ensure that the collector is on the wheeled vehicle by pressing the control button (6) of the product collector.

The wheeled vehicle (1) comprises a product identity reader (7) such as a barcode scanner in order to identify the picked products before putting into the cart (2) or identify them when they are removed from the cart (2) to be arranged on the shelf. Thereby, the comparison between the products put in the cart (2) and removed from the cart (2) and the products in the order list can be made. The product identity reader (7) can be used to remove the product put in the cart (2) by mistake (or in a case when there is no need for the product picking for some reason). In such a case, the product collector can perform the removal process after selecting an option such as the product removal option from the interface screen (5). Each cart (2) may include at least one weight sensor placed in the bottom. The weight sensor can be used for several controls, for example, the situations where it may be undesirable to exceed a predetermined upper limit of the weight of the products placed in the cart can be controlled. When a product placed in the cart needs to be removed from the cart the comparison between the weight of the removed product and the weight of the product required to be removed prevents a faulty product removal process. When the picked or removed product is read to the identity reader (7), this information can be transmitted to the main control unit via the cart controller (4) along with the obtained information from the weight sensor.

As can be seen better from FIG. 2, a radar such as a lidar (8) in the front side of the wheeled vehicle (1) is devised. The lidar (8) ensures if there is any obstacle in front of the wheeled vehicle (1) during its movement, if there is, allows it to stop or go around this obstacle, and if it is not possible to go around the obstacle, to reach the targeted location by using another route. On the other hand, the presence of the obstacle detected by the lidar (8) can be transmitted to the main control unit via the cart controller (4), so that it may be possible for the software in the main control unit to perform controls such as providing the road optimization of the wheeled vehicle (1) and notifying a service unit to remove this obstacle.

Figure 3:
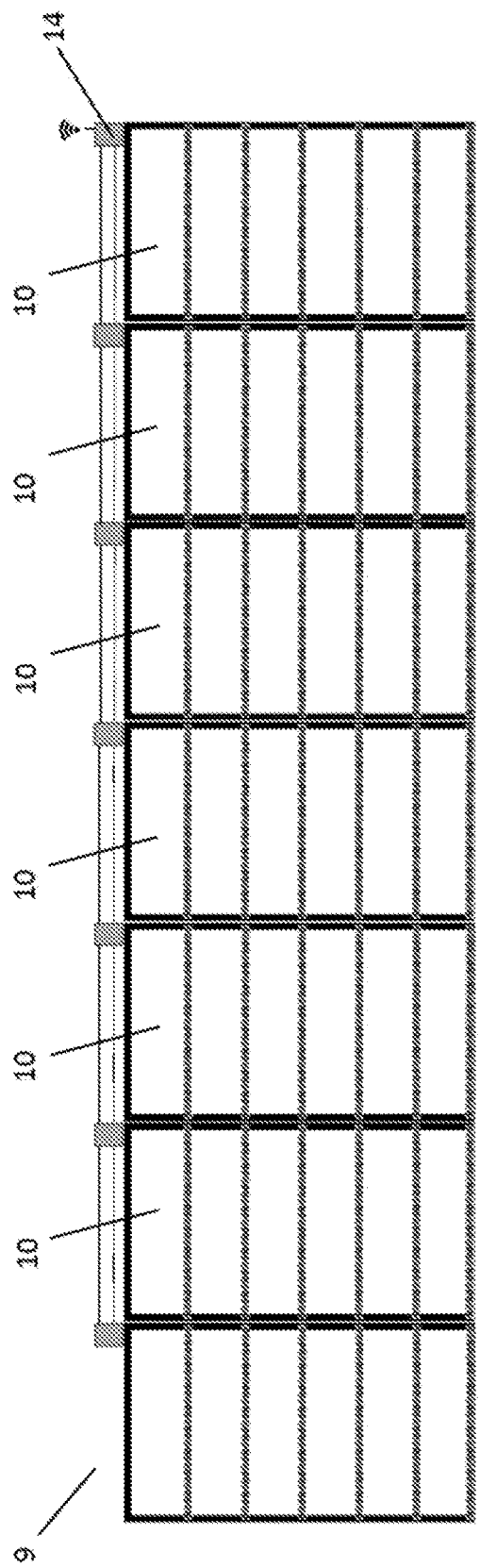
In FIG. 3, a front view of a series of shelves in the automation system in accordance with the invention is provided.
Figure 4:
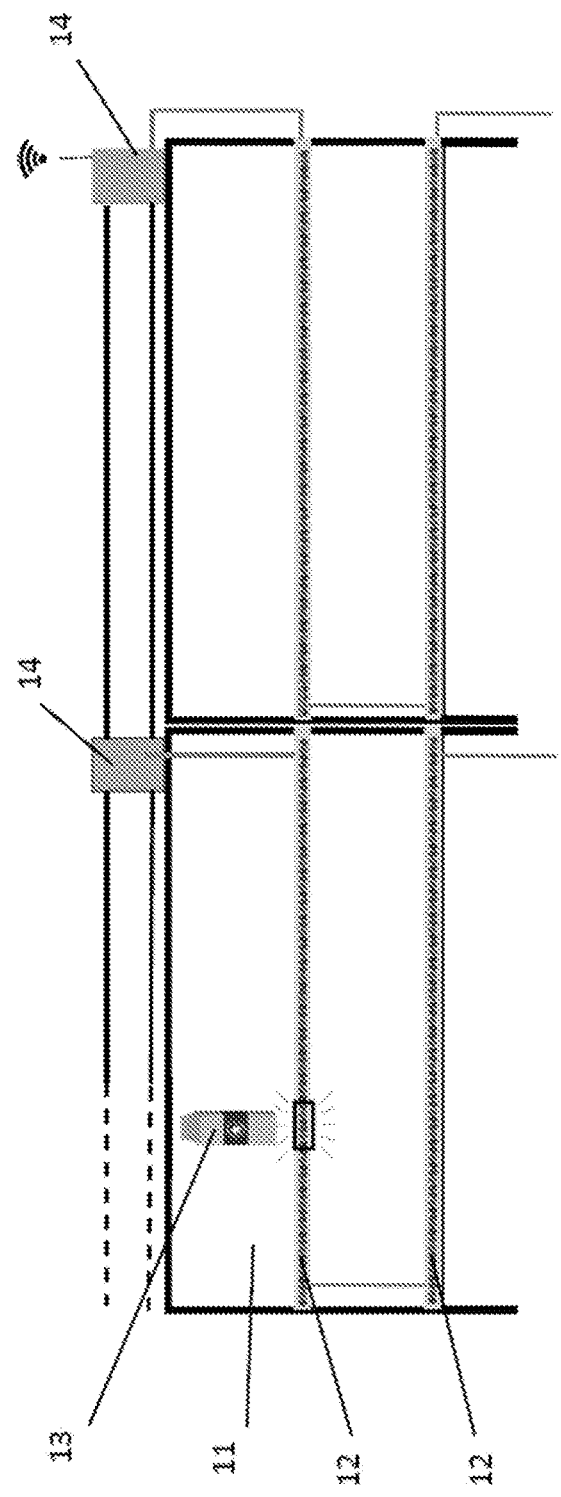
In FIG. 4, a part of the shelf series in FIG. 3 is provided.

The shelf series, which is further component of the automation system according to the invention, and some of the shelf units, which are its sub-components, are shown in FIG. 3 and FIG. 4. A series of shelves (9) preferably comprises a number of shelf units (10) arranged side by side. Each shelf unit (10) also preferably comprises a number of shelf partitions (11) arranged one above the other. The series of shelves (9) or shelf units (10) are located on the base. Here, with the phrase "on the base", an arrangement to be directly on the base or slightly above the base, for example, to be mounted on the wall should also be appreciated. The products (13) stored or to be stored, are arranged in the shelf partitions (11) appropriately. Each shelf partition (11) comprises a number of lighting elements (12), preferably LED strip, extending across the partition. Each shelf unit (10) is associated with a shelf controller (14). Each shelf controller (14) is connected to control and communicate with the LEDs in the related shelf unit.

According to one embodiment of the invention, a particular shelf controller in each shelf series may be arranged to communicate with the main control unit. The communication between this particular shelf controller and the main control unit may be a wired connection or wireless connection (e.g. using any suitable wireless communication protocol known in the art. For example, Wi-fi, a local area network (LAN), wireless local area networks (WLAN), Internet, etc.). The shelf controller of each remaining shelf unit in a shelf series may also be arranged to communicate with a shelf controller that can communicate with that main control unit. According to an alternative embodiment, each shelf controller (14) may be arranged to communicate independently with the main control unit.

Figure 9:
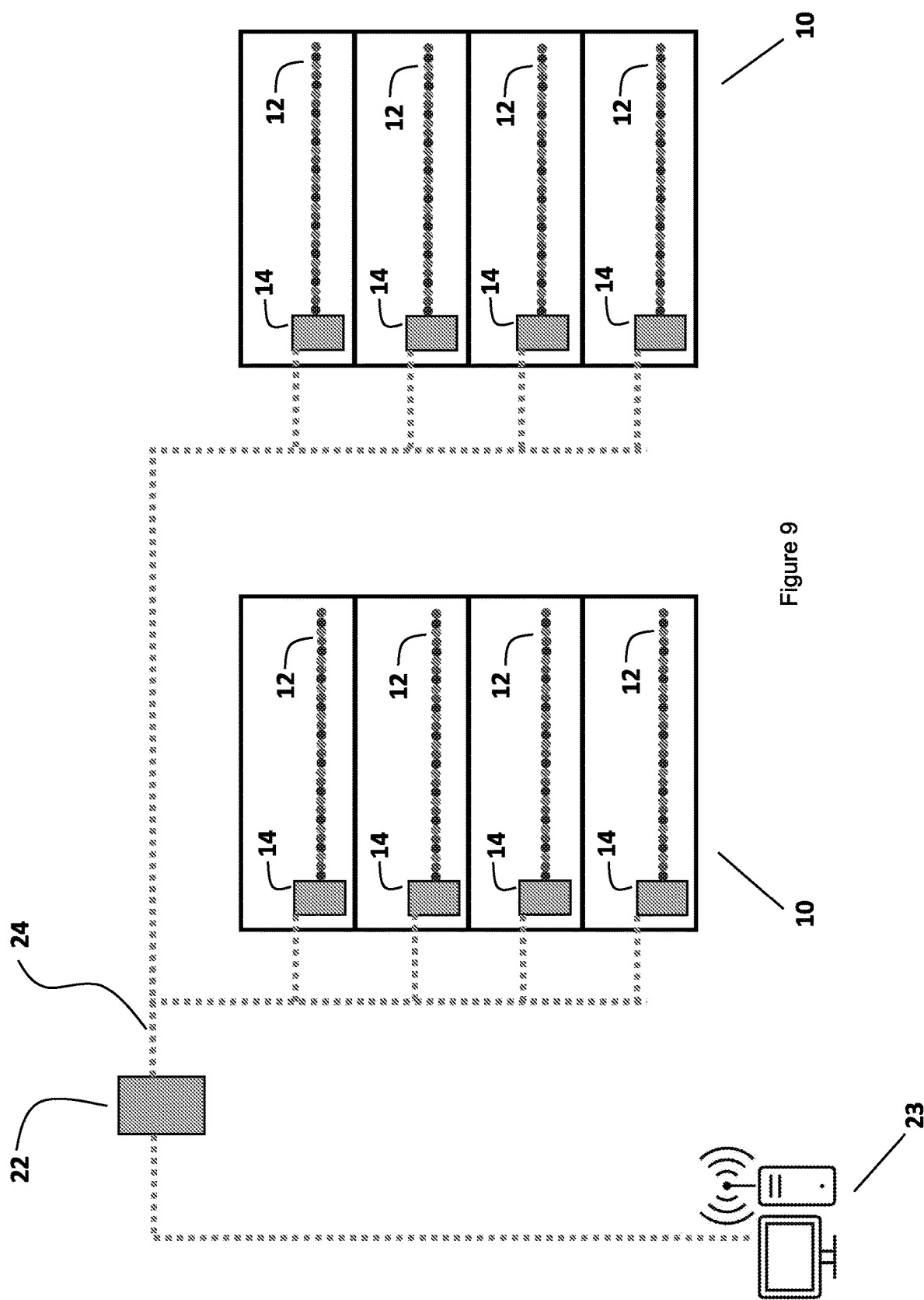
In FIG. 9, a view of the controller connections in two shelf units in the automation system in accordance with the invention is provided.

An alternative embodiment of the invention is shown in FIG. 9. According to this embodiment, each shelf of each shelf unit (10) is equipped with a shelf controller (14). Here, each shelf controller (14) can be connected to the main controller (22) via a cable (24) independently of other shelf controllers. In other words, all shelf controllers (14) can be in parallel connection to the main controller (22). In this embodiment, the term "cable" can be considered both a power cable and a data cable. Thus, it becomes possible to independently control each shelf controller (14) (and therefore the associated lighting element (12) connected to each shelf controller) via only two cables (power cable and data cable) coming out of the main controller (22). Such an embodiment has an advantage over the arrangement having lighting elements connected in series to a shelf controller (14) shown in FIG. 4 and arranged in each shelf unit (10). Thus, because the number of cables is reduced and there is no cable outlet from each lighting element, ease of assembly is provided. The main controller ((22)) can be placed inside a computer (23) and it can be connected to the computer (23) with wires such as RS485, RS432, CAN or wirelessly such as Wi-Fi.

The controllers said within the scope of this specification perform the necessary calculations through the processor(s) and associated memory device(s) known in the art. The processor(s) may refer to an integrated circuit, a microcontroller, a PLC, Application Specific Integrated Circuits (ASICs), Field Programmable Gate Arrays (FPGAs), etc. Memory device(s) may refer to a computer readable non-volatile medium, hard disk drives, flash disks, solid state storage devices, compact disk read/write (CD-ROM, CD-R/W), RAM, etc.

Figure 5:
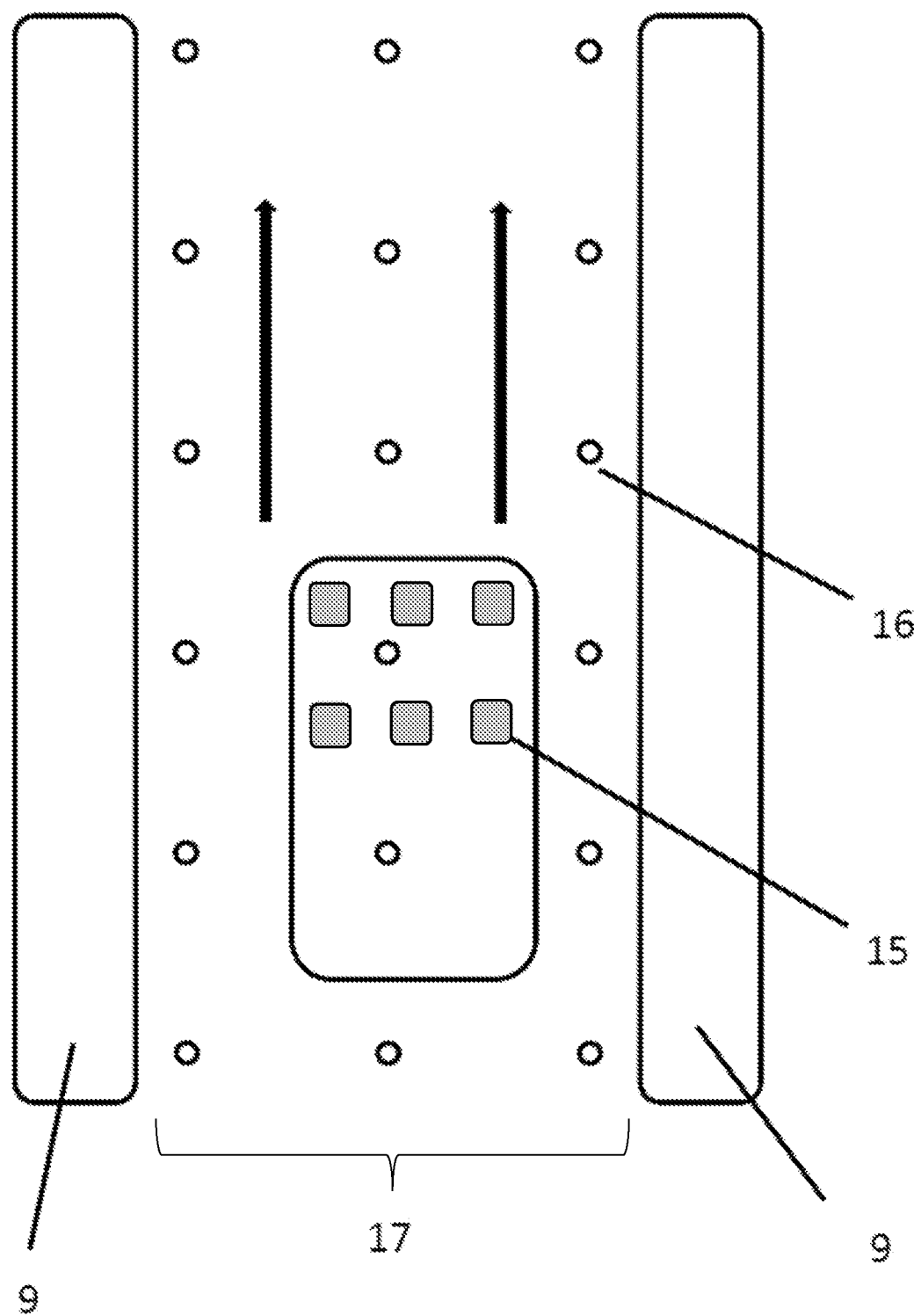
In FIG. 5, a representative view of a location determination arrangement according to the ultra high-frequency application of the wheeled vehicle is provided.

The products (13) are placed in the related shelf partition according to a certain order. For example, the same type of product may be placed or will be placed in a particular shelf partition or shelf unit. Or, the same type of product can be arranged or will be arranged along a certain length in the same shelf partition, the remaining length of this shelf unit can be or will be reserved for another type of product or products. The information of which product is or will be in which shelf series/shelf unit/shelf partition is kept in the main control unit memory or in the memory of the related shelf controller communicating with the main control unit. Thus, when the wheeled vehicle (1) reaches near the related shelf partition or enters the related hallway (17) as shown in FIG. 5, LEDs for that product can be controlled by the main control unit or shelf controller, attracting the attention of the product collector (for example, it can be turned on continuously for a certain period of time, it can be turned on/off or the color can be changed, the turn on/off times can be changed, when a number of wheeled vehicles arrive in the same product region, the LEDs can be commanded individually for each wheeled vehicle, that is, for a product collector, the LEDs with the related product can be lit in blue, for example, and for the other collector, the LEDs with the other product can be lit in green, etc.). The color of the LEDs can also be chosen so that a color-blind product collector can easily see these LEDs.

For example, if a signal is sent from the main controller to the corresponding shelf controller, the command sequence in this signal includes the information such as the address of the related shelf controller, the LED range under the control of this shelf controller and desired to be active, whether the LEDs will be activated or deactivated, the activity mode of the LEDs, color information of LEDs to be activated, brightness information of LEDs to be activated. This command sequence can be transmitted to a specific shelf controller in a shelf series and from there to the corresponding shelf controller as described above, and the received command is executed until a new command is arrived.

On the other hand, shelf areas with different product groups can be indicated by different light colors (e.g. beverages are white, food is red, cleaning supplies are purple, etc.), regardless of the product picking or the product loading on the shelf.

Again, according to an embodiment, regardless of the product picking or product loading on the shelf, the shelf areas where the products are located can be indicated with different colors according to the stock level (for example, out-of-stock products are red, critically stocked ones are yellow, high-stocked ones are green, etc.).

Various arrangements can be used to determine the location of the wheeled vehicle (1) on the base, for example, a symbolic view related to an ultra-high frequency (UHF) arrangement is given in FIG. 5. In this embodiment, each wheeled vehicle (1) comprises a number of UHF readers (15), known in the art, preferably located in a region near its bottom. A number of tags (16) are arranged at a distance from each other on the base on which the wheeled vehicles (1) travel. Each tag (16) has a unique electronic product code. The physical location of each tag laid on the base is numerically mapped in the software running on the main control unit, and the location of each of these tags is known as absolute or relative.

When the wheeled vehicle (1) moves, the readers (15) perform the tag reading process continuously and simultaneously. Readers collect information such as tag ID and signal level while passing over any tag. The wheeled vehicle (1), which receives the signal strength information of each reading, also determines its own location since it communicates with the main control unit and has the location information of the related tag. Thus, the related wheeled vehicle (1) transmits its own location information to the main control unit.

Figure 6:
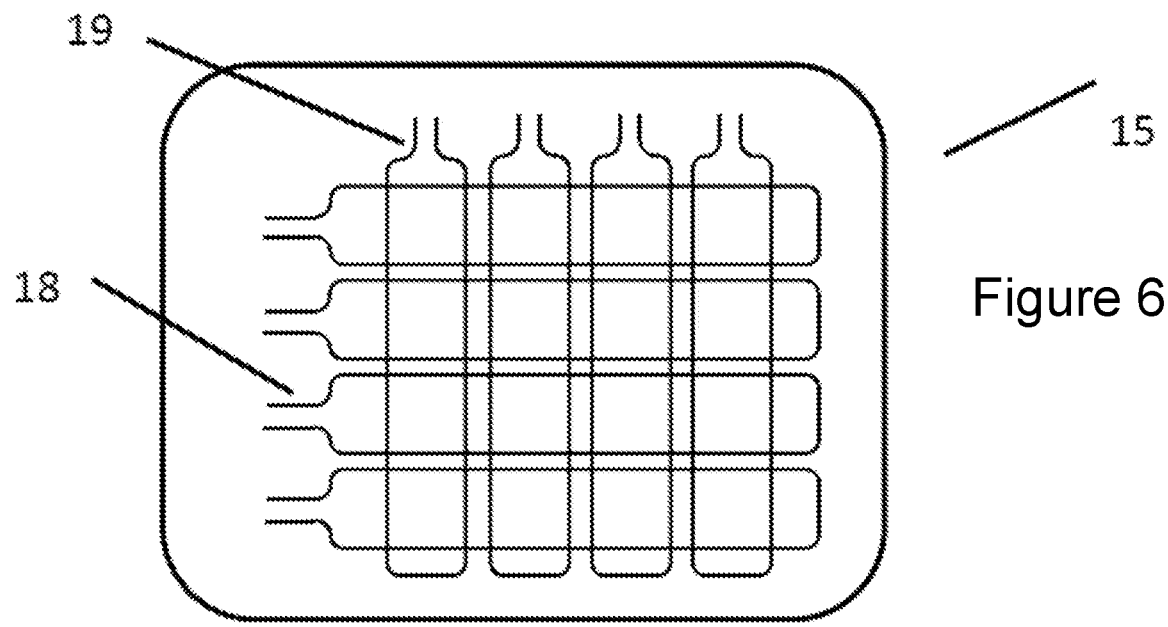
In FIG. 6, a representative view of a RFID matrix reader placed on the bottom part of the wheeled vehicle is provided.
Figure 7:
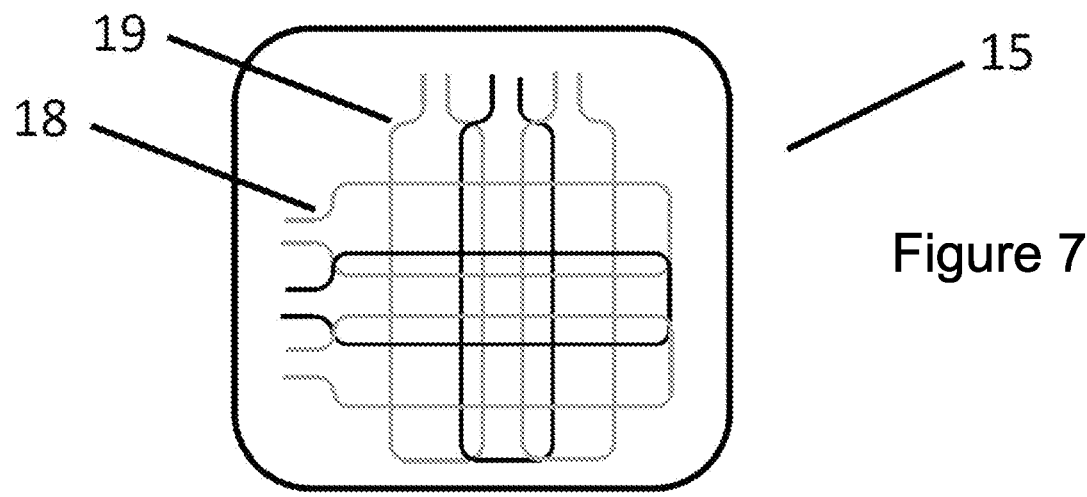
In FIG. 7, a representative view of an optimized RFID matrix reader placed on the bottom part of the wheeled vehicle is provided.

Instead of a UHF reader, the wheeled vehicle (1) may also include a reader arranged in the form of an RFID matrix (FIG. 6, FIG. 7). An RFID matrix reader with a standard array is shown in FIG. 6. This matrix reader can be placed at the bottom part of the wheeled vehicle (1) and includes a number of transmitting antennas (18) and receiving antennas (19) extending transversely (preferably at right angles) to each other. These transmitting antennas (18) and receiving antennas (19) have an longitudinal shape to match the bottom form of the wheeled vehicle (1).

Also, in this embodiment, there are tags laid on the base/hallways, as described above. The transmitting antennas (18) on the wheeled vehicle are triggered sequentially (i.e. 1st, 2nd, 3rd etc.) and it is checked whether information on that the tag has been read is received from any of the receiving antennas (19). If no information is received from any receiving antenna, the next transmitting antenna is triggered and the same action is repeated. If information about a tag is read from any receiving antenna after any transmitting antenna is triggered, the wheeled vehicle (1) can also determine its own location, since it knows the absolute location of that tag according to the active related transmitting antenna and the related receiving antenna. After detecting its own location, it transmits this location information to the software in the main control unit.

In this method, the tag can be read in the region as much as the multiplication of the number of transmitting antenna by the number of receiving antennas used in this method. For example, in the case of 4 transmitting antennas and 4 receiving antennas, the tag can be read from 16 regions (i.e. as many as the number of regions where the transmitting antennas and receiving antennas intersect as shown in FIG. 6). If a total of 8 antennas (4 transmitting antennas+4 receiving antennas) are used, tags can be read from 16 regions. Antenna numbers can be chosen as desired, so when the number of antennas is increased, the sensitivity of location detection also increases.

An optimized RFID matrix reader is shown in FIG. 7. The receiving antennas (19) and transmitting antennas (18) are also placed on the bottom part of the wheeled vehicle (1) in a similar manner as described above in this embodiment. However, in the optimized embodiment, both the transmitting antennas and the receiving antennas are arranged to intersect sequentially within a certain distance. Thus, using fewer antennas, more tag reading regions can be achieved.

The number of regions that can be obtained in this method is (2*number of transmitting antennas−1)*(2*number of receiving antennas−1). For example, in the case of 3 transmitting antennas and 3 receiving antennas, the tag can be read from 25 regions. (that is, as many as the number of regions where the transmitting antennas and the receiving antennas intersect, as shown in FIG. 7). In other words, if a total of 6 (3 transmitting antennas+3 receiving antennas) antennas are used, tags can be read from 25 regions. Here, when the number of antennas is increased, the sensitivity of location detection also increases.

Figure 8:
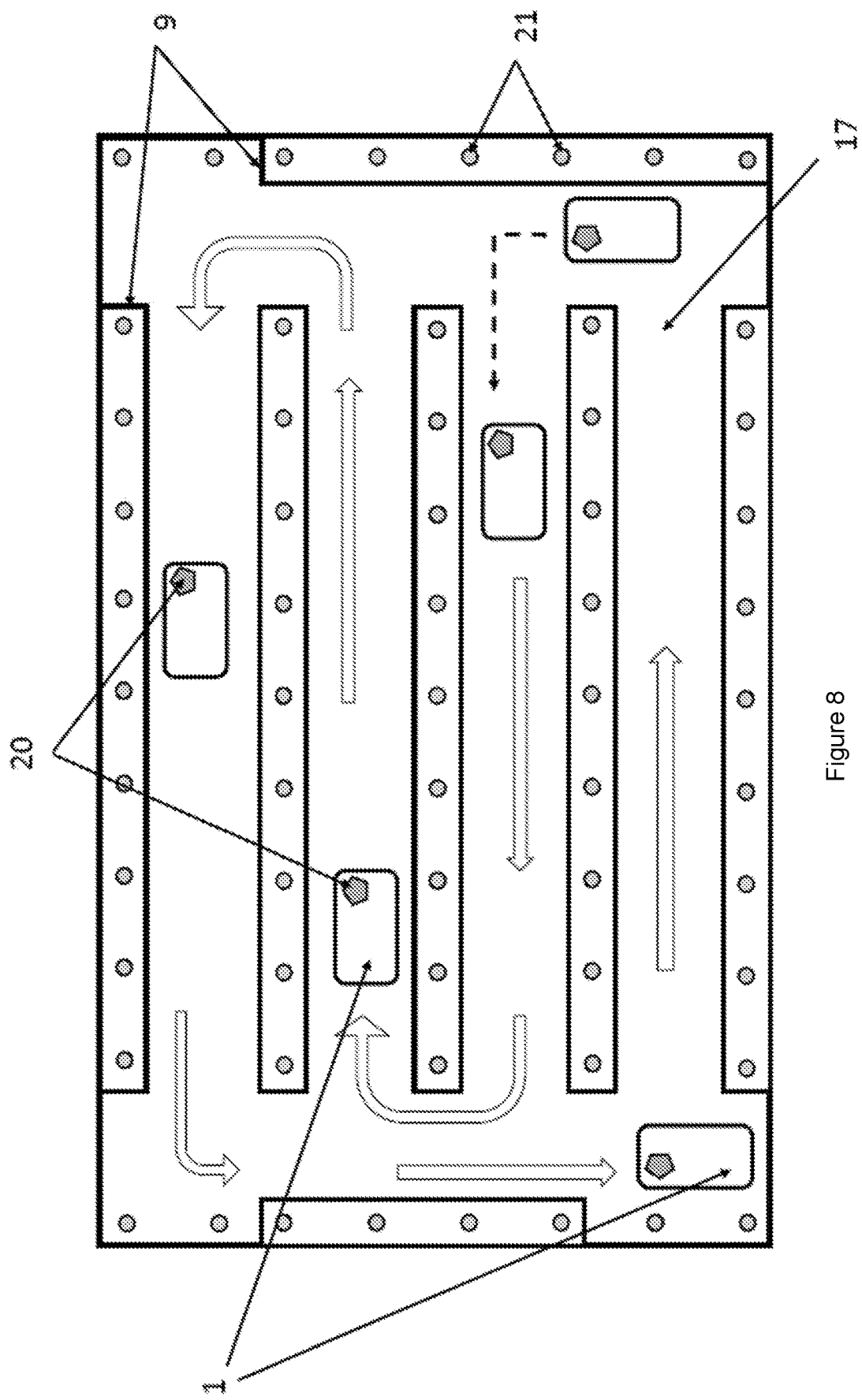
In FIG. 8, a representative view of a location determination arrangement according to the ultra-wideband application of the wheeled vehicle is provided.

As shown in FIG. 8, the location of the wheeled vehicle (1) can also be determined by an ultra-wideband (UWB) arrangement. In this embodiment, fixed readers (21), called nodes, can be fixed in a suitable location (e.g. a wall, a shelf series, etc.) in the storage area. Each wheeled vehicle (1) is equipped with a UWB cart tag (20). UWB cart tags (20) can communicate with the fixed readers (21). Therefore, the fixed readers (21) can detect the locations of the wheeled vehicles (1) and transmit this information to the main control unit.

The software running in the main control unit of the automation system according to the invention is configured with a route optimization algorithm. This route optimization algorithm sends commands to the wheeled vehicles by calculating which wheeled vehicle (1) would be more suitable to follow which route to reach the product or the place where the product will be loaded, in the most efficient way. According to one embodiment of the invention, the wheeled vehicles (1) may not be provided to communicate with each other. In other words, each wheeled vehicle receives the command to move to the target area where the product will be picked or dropped, from the main control unit, and each cart controller activates the mechanical drive unit by sending a signal to the motor drive circuit of the wheeled vehicle based on the activation command it received.

The wheeled vehicle (1) according to the invention can be equipped with several proximity sensors in its various portions, e.g. on its front and sides. These distance sensors can generate a signal if an object comes too close, for example, a shelf in order to picked or drop off the products. This warning signal can be given directly to the product collector via the cart controller, or it can be transmitted to the main control unit and various controls such as reducing the speed of the wheeled vehicle or stopping it can be provided. With this warning signal, various controls such as reducing the speed or stopping of the wheeled vehicle and changing the direction thereof can be provided by being evaluated directly by the cart controller.

The invention claimed is:

1. A product storage area automation system, comprising:
   a base,
   at least one shelf unit having at least one shelf, located on the base for arranging a number of products,
   a shelf controller associated with the at least one shelf unit,
   a main control unit configured to communicate with the shelf controller and controlled by an automation software,
   a wheeled vehicle having a basket controller configured to communicate with the main control unit, and
   a product identity reader configured to read the information on each product,
   wherein the at least one shelf unit comprises a plurality of lighting elements configured to communicate with the shelf controller or with the main control unit, and the wheeled vehicle comprises a riding stand for carrying a human product collector;
   wherein the wheeled vehicle is autonomous; and
   wherein the plurality of lighting elements corresponds to a respective position of each of the products on the at least one shelf unit and are activated to attract an attention of the human product collector when the wheeled vehicle reaches near the at least one shelf unit associated with the respective position of each of the products.

2. An automation system according to claim 1, wherein the at least one shelf unit includes at least a first shelf unit and a second shelf unit, the first shelf unit comprising a first shelf controller configured to communicate with the main control unit, the second shelf unit comprising a second shelf controller, the second shelf controller being configured to communicate only with the first shelf controller.

3. An automation system according to claim 1, wherein the at least one shelf unit comprises at least one shelf controller connected to each of the at least one shelf, each of the at least one shelf controller being connected to the corresponding lighting elements connected to each of the at least one shelf, and each of the at least one shelf controller being connected to the main controller independently from one another.

4. An automation system according to claim 3, wherein the plurality of lighting elements comprise LEDs in the form of a strip extending at least partly along a length of each of the at least one shelf unit.

5. An automation system according to claim 1, wherein the main control unit is configured to control the path route of the wheeled vehicle.

6. An automation system according to claim 3, further comprising an electronic arrangement for determining the location of the wheeled vehicle.

7. An automation system according to claim 6, wherein the electronic arrangement comprises at least one reader arranged with the wheeled vehicle and a plurality of labels configured to communicate with the reader wirelessly, each label having a unique electronic product code and provided on the base.

8. An automation system according to claim 7, wherein the reader is an ultra high-frequency reader.

9. An automation system according to claim 7, wherein the reader is an RFID matrix reader.

10. An automation system according to claim 9, wherein the RFID matrix reader comprises a plurality of transmitting antennas and receiving antennas extending transversely to each other.

11. An automation system according to claim 10, wherein the RFID matrix reader is configured to trigger the transmitting antennas sequentially and to control the reading of a label from any of the receiving antennas.

12. An automation system according to claim 11, wherein both transmitting antennas and receiving antennas are arranged for not to intersect sequentially within a certain distance.

13. An automation system according to claim 11, wherein both transmitting antennas and receiving antennas are arranged to intersect sequentially within a certain distance.

14. An automation system according to claim 6, further comprising a number of fixed readers and an ultra-wideband (UWB) basket label connected each wheeled vehicle, each basket label wirelessly communicating with the fixed readers.

15. An automation system according to claim 1, wherein the automation software is configured to provide a path optimization algorithm for each wheeled vehicle.

16. An automation system according to claim 1, wherein the wheeled vehicle comprises a radar such as a lidar provided on the front side of the wheeled vehicle.

* * * * *